UNITED STATES PATENT OFFICE.

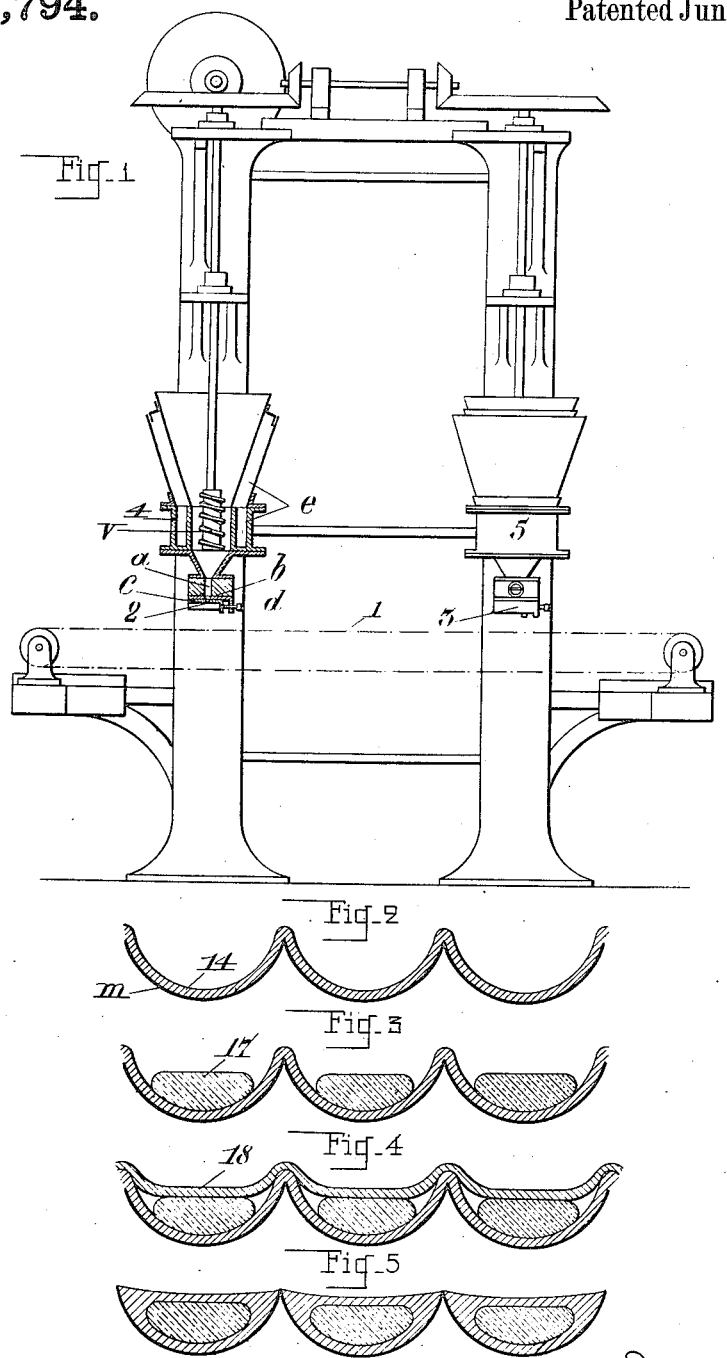

JULES ROUSSEAU, OF SEDAN, FRANCE.

PROCESS FOR MANUFACTURING FILLED STICKS AND OTHER ARTICLES OF CONFECTIONERY WHOLLY OR PARTIALLY COVERED WITH CHOCOLATE.

1,144,794.

Specification of Letters Patent.

Patented June 29, 1915.

Application filed August 22, 1912. Serial No. 716,419.

*To all whom it may concern:*

Be it known that I, JULES ROUSSEAU, citizen of the French Republic, residing at Sedan, in the Department of the Ardennes, France, have invented a new Process for Manufacturing Filled Sticks and Other Articles of Confectionery Wholly or Partially Covered with Chocolate, of which the following is a specification.

This invention relates to a new process for manufacturing filled sticks and other articles of confectionery, covered with chocolate, the said process permitting of the use, in the manufacture of the above articles of ordinary chocolate instead of the special chocolate known as "covering."

It is known that up to the present, the filled sticks, and other articles of confectionery of a like kind, with which the present invention is concerned, have been made by the use of a special chocolate, rendered almost liquid at the molding temperature, by means of the addition of a strong preparation of cocoa-butter, or other suitable ingredient, which chocolate has been termed "coating" or "covering" chocolate.

In principle the process forming the subject matter of the present invention consists in covering the confection fillings with two strips of chocolate, the thickness of which can be regulated as desired, and which may be obtained by any suitable means, as for example, by compressing the chocolate, at the molding temperature, in an appropriate apparatus, from which it passes out, through orifices adjustable at will, in the form of strips or ribbons of variable thicknesses. Strips or ribbons having a thickness of no more than one millimeter can thus be readily obtained. This compression may be effected either in a vertical cylinder, or by an endless screw working in an appropriate vessel, or in crushing or rolling machines of any type. And in order that the invention may be readily understood, I will now describe the same fully with reference to the accompanying drawings, which show by way of example a suitable apparatus, and in which—

Figure 1 is a diagrammatical view, partly in section, showing an apparatus whereby the process in question can be carried out. Figs. 2, 3, 4 and 5, are views showing the different phases in the manufacture of the product.

The molds, placed on an endless traveling apron or conveyer 1, are brought successively under each of the orifices 2 and 3 of the cylinders 4 and 5. These cylinders are provided, in the example chosen, with a double jacket $e$, through the space between which and the cylinder an appropriate heating fluid can be circulated; and within each of the said cylinders is mounted a worm or screw $v$, which acts to compress the chocolate and to force it out, through the adjustable orifices 2 and 3, in the form of strips or ribbons of any desired thickness. On passing under the cylinder 4, the first strip or ribbon of chocolate assumes the configuration of the bottom of the mold $m$, thus producing a kind of goffered tablet 14, corresponding in shape to the form of the mold (Fig. 2). One or more operatives, or work girls, located between the two cylinders 4 and 5, in front of the endless traveling apron or conveyer 1, place the creams, or fillings of any other kind of confection 17, prepared beforehand, into the molds which are moved or fed along in front of them (Fig. 3). On passing under the cylinder 5, the molds thus prepared are covered by a second strip or ribbon of chocolate 18, (Fig. 4). After any superfluous chocolate which may be on the molds has been scraped off by hand, or mechanically, all that is necessary is to place the molds, thus filled, on to an agitator, or shaker, or on to a vibratory or shaking traveling way, so that any air which may have become confined with the cream or confection escapes, and that the molds may be ready to be transferred to the cooler (Fig. 5).

If a small portion of the chocolate should fall on to the traveling apron, or conveyer, this chocolate is removed by a scraper, similar to that employed in the crushers, and it may then be used again in the manufacture, so that there is thus practically no loss.

It will be understood that an apparatus capable of giving the results above indicated may be constructed with other arrangements of parts, and of variable dimensions and proportions, while, at the same time, preserving the industrial application of the process forming the subject of the present invention, and that the drawings accompanying the present description must be considered as showing merely, by way of example, one form of apparatus of this kind. Nevertheless, the arrangement which is here shown with the vertical cylinders 4 and 5 presents, among others, the following advantages over horizontal cylinders such as are usually employed in chocolate compressing machines or mills known in France as "boudineuse." Reduction in the length of the path to be traversed by the chocolate to reach the outlet orifice. Increased facility in the cleaning of the apparatus. Less space occupied. Greater accessibility to the traveling apron or conveyer for the molds.

As regards the heating of the cylinders 4 and 5, it is evident that, if desired, any usual or well known means can be employed for this purpose, such as hot water circulation, ordinary heaters, or electricity.

A machine of small dimensions worked, if needed, by hand, and having a single cylinder under which the mold is caused to pass twice, may be constructed, which would obviously give the same result as a machine with 2 cylinders, but with a less output.

An apparatus adapted for a large output may also be constructed with two, or even more, orifices, juxtaposed at the outlet of each cylinder, so as to be capable of charging several molds together at each passage or journey.

The ajutage or nozzle may be made in any manner, provided it allows of the regulation of the passing out of the strip or ribbon of chocolate, and I hereby reserve to myself the right to employ any form of ajutage or nozzle giving the above specified result, and capable of being constructed in any manner appropriate for this purpose.

The width of the strip or ribbon may be regulated by two metal slide-pieces which may be moved, or adjusted, by means of a screw, and placed in front of, and in combination with, a fixed ajutage or nozzle, so as to enable an orifice to be left free of a width corresponding to that of the desired strip or ribbon. For instance, the thickness of the strip or ribbon can be regulated by means of a movable metal slide-piece c, which can be displaced for adjustment by means of a screw d, in relation to the larger dimensions of the orifice of the fixed ajutage or nozzle a, so as to reduce, as desired, the width of this latter, up to an ultimate position of complete closure of its lower extremity b.

In the above description it has been assumed, for the sake of simplification, that the previously prepared fillings are deposited by hand, by one or more operatives, or work girls, into the molds moving or traveling in front of them during their passage between the cylinders 4 and 5. It is obvious, however, that these operatives, or work girls, can be replaced by a mechanical device effecting the same operation, without, in any way, departing from the process forming the subject of the present invention. This mechanical device may take the form of a distributer depositing, in the molds, the fillings prepared beforehand— creams run into starch for example—or, again, the form of a device depositing between the chocolate strips or ribbons, a certain quantity of plastic alimentary material, chocolate praliné, for example, or baked sugar, placed in a mass in the distributing apparatus. A machine can even be constructed in this manner without any difficulty in which, between the two extreme ajutages afforded by the outer part of the articles of confectionery manufactured, there is arranged a combination of hand or mechanical distribution giving a superposition, or a juxtaposition, of various materials, and in this way enabling filled tablets, the confections in which may be as complex as desired, to be obtained.

The process forming the object of the present invention applies to the manufacture of cream confectionery articles molded in chocolate.

Heretofore, confectionery articles filled with cream were obtained by running the baked sugar (cream) either into starch, or into appropriate molds replacing this substance, then allowing the sugar to solidify so as to take the desired form, and then molding or coating the fillings, thus prepared, into the chocolate.

The present process enables the cream to be run directly into the chocolate with which it is to be covered, this running in operation being effected by hand, or mechanically.

For carrying out this process the mode of operation above described can be utilized which consists in depositing in the molds two chocolate strips or ribbons between which the creams, prepared beforehand, are placed, as above stated, and by subjecting the whole to a shaking or vibratory action to impart to the article of confectionery its final form. The process may, however, be practically carried out by any other means which would allow of the mold being furnished with a thin layer of chocolate, and this otherwise than by the deposit of the chocolate strip in the above indicated manner. In fact, a machine can be employed, in which, after the molds have been filled with chocolate, the necessary quantity is removed so as to admit of the direct running in of the cream, according to the process in question.

According to this process the sugar, baked to the requisite degree, is caused to flow directly into the molds m, prepared as indicated in Fig. 2, of the annexed drawings, and which sugar, by itself, then assumes at once the desired form, this action being aided, if necessary, by the subsequent application or a jogging or vibratory motion. The manufacture can furthermore be carried out in the manner indicated in Figs. 2, 3, 4 and 5, it being understood that if the mold be supplied with chocolate, by any process other than that which has been previously described, the sugar is always run into the mold in the same way.

According to the degree of baking to which it has been subjected, the consistency of the sugar may vary widely, and there can therefore be employed various modified arrangements for the running in operation, without departing, however, from the process forming the subject of the present invention, that is to say, the running in of the sugar into the chocolate in every case.

Creams, under certain conditions of baking, temperature, of proportion of glucose, &c., may be sufficiently liquid to be run by gravity. In other cases, on the contrary, it may be necessary to compress the sugar so as to cause it to be fed or run in through an appropriate ajutage or nozzle. For the manufacture of a like article, it is, moreover, easy to find various mechanical devices enabling the baked sugar to be run into the chocolate, and to introduce into the molds the desired quantity of cream. On the other hand, however, the various kinds of articles of confectionery which can be manufactured, being unlimited, it results from the preceding, that the system of distribution of the sugar may be greatly varied, in the different applications of the improved process forming the subject of the present invention. The case most generally met with, would be that in which the sugar, not being sufficiently liquid to run by gravity, it would become necessary to compress it, for instance by a worm or endless screw, so as to cause it to be ejected or fed from the distributing apparatus.

Claims:

1. A process consisting in squirting horizontally a layer of hard chocolate; supporting said layer at separate parts, whereby the layer will sag therebetween; depositing masses of filling at the sagging portion; depositing another layer over said filling and first named layer; and joggling said layer while still supported at said parts.

2. A process consisting in squirting a continuous layer of hard chocolate across a plurality of molds; depositing placing masses on said filling over the intra-marginal portion of the mold; squirting another layer of hard chocolate over said filling and first named layer; and joggling the molds for dividing the chocolate layer in accordance with the boundaries of the mold.

3. A method of manufacture of filled sticks and other articles of confectionery wholly or partly covered with chocolate which method allows of the use of ordinary hard chocolates instead of the special chocolate called "covering chocolate" said process consisting in squirting the hard chocolate in strips of chocolate of a thickness regulatable at will; passing empty molds intended to shape the desired products under the above mentioned strips when being squirted; placing upon the first strip thus laid at the bottom of the molds the previously prepared filling which is to fill the article in question; making the thus far filled molds pass under squirted strips of hard chocolate, the thickness of which is regulated at will, in order to cover the filling with a second layer of chocolate and finally subjecting the molds containing the chocolate covered filling to a more or less energetic joggling which completes the operation by dividing the chocolate strips in accordance with the divisions of the molds.

4. A method of manufacture of filled sticks and other articles of confectionery wholly or partly covered with chocolate, which method allows of the use of ordinary hard chocolate instead of the special chocolate called "covering chocolate", said method consisting in squirting the hard chocolate in strips of chocolate of a thickness regulatable at will; passing a corresponding number of rows of molds intended to shape the desired products under these strips while being squirted; running directly into the molds, upon the first strip of chocolate thus laid at the bottom thereof the baked sugar fillings without running the same first through starch; passing the thus far filled molds under strips of hard chocolate while being squirted, of a thickness regulatable at will, in order to cover the fillings with a second strip of chocolate, and finally subjecting the molds containing the chocolate covered fillings to a more or less energetic joggling which completes the operation by dividing the chocolate strips in accordance with the ribs of the mold.

In testimony whereof I have signed my name to this specification in the presence of two subscribing witnesses.

JULES ROUSSEAU.

Witnesses:
 ANDRÉ BORDILLON,
 JULES FAYETTE.